Patented Apr. 1, 1930

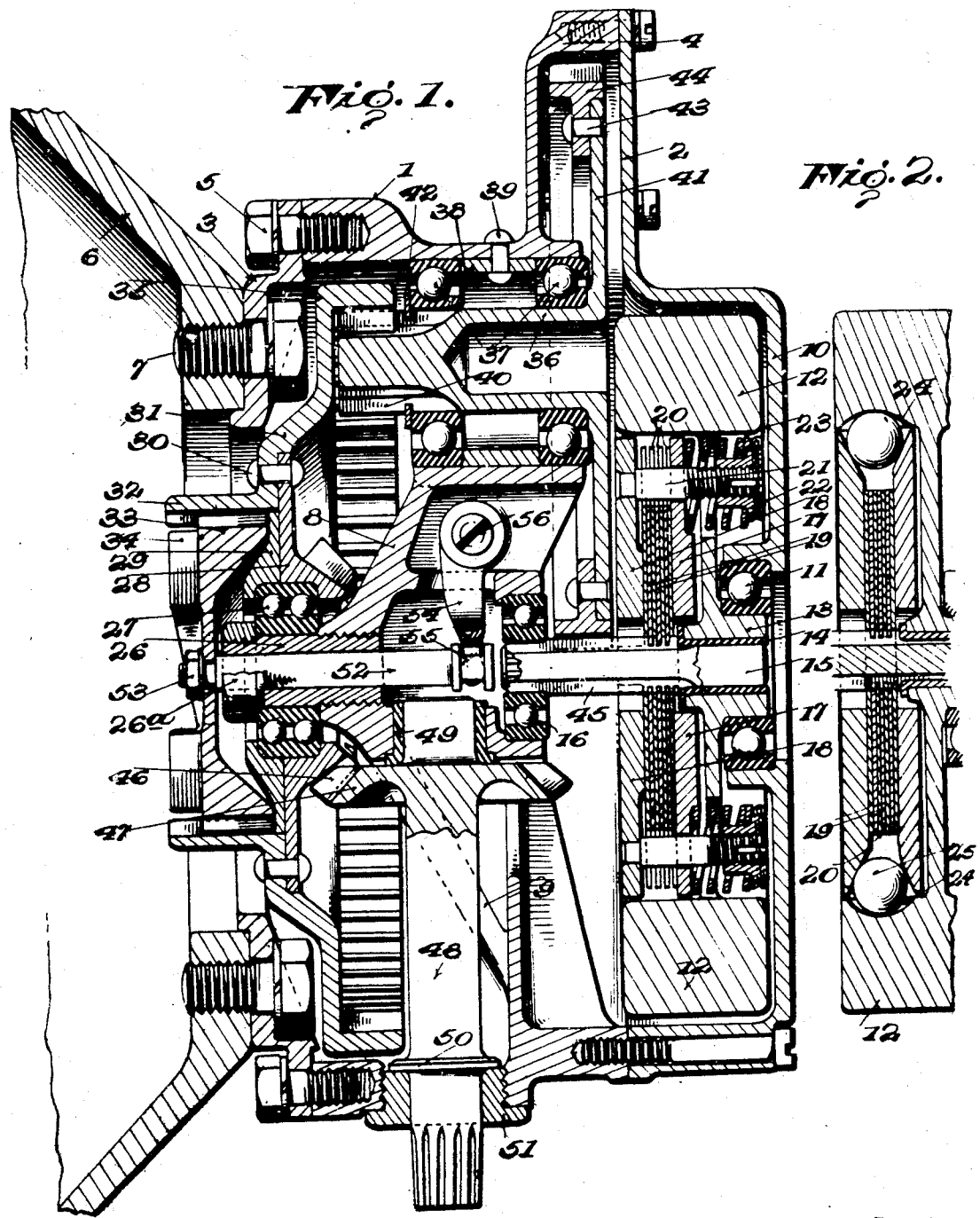

1,752,835

UNITED STATES PATENT OFFICE

ROLAND CHILTON, OF KEYPORT, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK

ENGINE-STARTING APPARATUS

Application filed January 30, 1929. Serial No. 336,311.

This invention relates to internal combustion engine starters of the type embodying an inertia member or flywheel.

One of the objects of the invention is to provide a novel starter mechanism embodying a flywheel which is efficient and reliable and of light weight and small size.

Another object is to provide starter mechanism of the type embodying an inertia member or flywheel having a novel arrangement of parts which conduces to compactness and reduction of overall dimensions. Other objects will appear hereinafter as the description of the invention proceeds.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In said drawings,

Fig. 1 is a sectional view of a starter embodying the invention; and

Fig. 2 is a partial view of the flywheel and associated parts.

The starter may be enclosed in any suitable housing or casing, which, in the form shown, comprises a substantially cylindrical section 1 provided with suitable end plates 2 and 3 secured to the section 1 by means of screws 4 and 5 respectively. The end plate 3 is preferably adapted to be secured to the casing 6 of an engine by any suitable means such as bolts or screws 7. The casing section 1 is preferably provided with a central support, indicated generally at 8, which is carried by arms or brackets 9 preferably integral with the casing section 1. The support 8 cooperates with the housing for the support of the starter mechanism to be described.

The end plate 2 is provided with a substantially circular well or depression 10, and at the center of said well is mounted a ball bearing 11 in which a flywheel 12 of small size and light weight is rotatably mounted.

Sufficient energy is stored in the flywheel 12, when rotating at high speed, to turn over the shaft of an internal combustion engine when said flywheel is clutched thereto through a speed reduction gearing, but in order to prevent the high initial resistance to turning, of the engine shaft, from breaking or otherwise damaging the starting mechanism, a yieldable driving connection is preferably interposed between the flywheel and the engine shaft. In this invention, the flywheel and the yieldable driving connection are combined in a single assembly which is arranged with respect to the reduction gearing and the engine engaging member in such a manner as to provide a very compact structure of small size. Accordingly, the hub 13 of the flywheel is bored and is provided with a bushing 14 within which one end of a shaft 15 is freely rotatable, the other end of said shaft being supported in a ball bearing 16 carried by the support 8. A pair of annular end plates 17 and 18 through which the shaft 15 passes freely are mounted within the flywheel 12. Between said plates a plurality of friction disks are mounted, one group of disks 19 being splined to the shaft 15 and the other group, the plates 20 of which alternate with the plates 19 of said first group, being carried by bolts 21. The bolts 21 pass through the end plates 17 and 18, one end of each bolt being suitably secured to the end plate 18. The other ends of said bolts are threaded and carry adjusting nuts 22, and springs 23 interposed between the nuts 22 and the end plate 17 maintain the friction disks 19 and 20 in engagement.

As shown more clearly in Fig. 2, the end plates 17 and 18 and the inner periphery of the flywheel rim are recessed or cut away, intermediate the bolts 21, to form pockets 24 in which are positioned balls 25. The depth of these pockets is preferably such that the balls do not interfere with the normal frictional engagement of the disks 19 and 20. The flywheel 12 will drive the end plates 17 and 18 through the balls 25 and walls of pockets 24, and said end plates will in turn drive the shaft 15 through the friction disks 19 and 20. If an overload is encountered, the balls will ride out of their pockets and force the end plates 17 and 18 apart against the tension of the springs 23, thereby relieving the pressure on the friction plates 19 and 20 permitting relatively free slippage therebetween.

At the opposite side of the casing and preferably in axial alinement with the combined flywheel and yieldable driving connection, an engine engaging member of any suitable type is provided which is adapted to be rotated by said flywheel through the intermediary of a reduction gearing and is capable of axial shifting movement to engage a member such as the shaft of an engine to be started. To this end, a sleeve 26 having a head 26ª is threaded in the support 8 and carries a ball bearing 27 on which is rotatably mounted a circular plate-like member 28 and retaining ring 29. Suitably secured to the periphery of the member 28, as by means of rivets 30, is an annular plate-like member 31 having a cylindrical barrel-like extension 32 in which is splined an engine engaging member 33 provided on the end thereof with suitable teeth 34. A rim 35 on the member 31 is provided with internal teeth and constitutes with members 31 and 28 an internal gear. A countershaft 36 is mounted in a pair of ball bearings 37 mounted between the casing 1 and the support 8, said bearings being spaced apart by means of a spacer 38 secured to the casing 1 by rivets 39. The countershaft 36 is provided at one end with teeth 40 meshing with the internal gear 35. At the other end of the countershaft is a flange or plate 41 which, together with a snap ring 42, holds the countershaft 36 and ball bearings 37 in assembled relation. To the periphery of the plate 41 is suitably secured, as by means of rivets 43, a toothed rim 44 meshing with teeth 45 formed on the shaft 15.

In the embodiment of the invention shown, the flywheel 12 is adapted to be brought manually to speed, and accordingly, the member 28 is provided with bevel gear teeth 46 with which meshes a bevel gear 47 on a cranking shaft 48 having one end rotatable in a bushing 49 mounted in the support 8, and having a collar 50 rotatably supported in a plug 51 which is threaded in the wall casing 1. The end of the shaft 48 which projects exteriorly of the casing is shaped to receive a hand crank or the like.

Any suitable means may be provided for axially shifting the engine engaging member 33, and as shown, a rod 52 is slidably mounted in the sleeve 26 and is provided with a shoulder and nut 53 by means of which it is adapted to engage and displace the member 33 axially in the barrel 32. Preferably, a shifting fork 54 which engages an annular groove 55 in the rod 52, is mounted on a rockshaft 56 which projects exteriorly of the casing.

When it is desired to use the starter mechanism, a crank or other suitable member, engaged with the outer end of the shaft 48, is rotated, and said shaft acts through the bevel gears 46, 47, the gears 35, 40, gears 44, 45, and the clutch means above described, to rotate the flywheel 12. Owing to the reduction gearing, the flywheel rotates at much higher speed than the cranking shaft 48. When the speed of the flywheel is sufficiently great, the rockshaft 56 is rocked to slide rod 52 and displace the engine engaging member 33, the teeth 34 engaging for example similarly formed teeth on the end of an engine crankshaft (not shown). The energy stored in the rotating flywheel turns over the engine crankshaft, the clutch means in the flywheel yielding in the case of the high initial resistance to turning, until the engine crankshaft rotates sufficiently to decrease the load beyond the point at which the clutch is adjusted to slip. When the engine starts, it overruns the engine engaging member and the shape of the teeth 34 is such that the latter is forced backward into the position shown in the drawings.

The starter mechanism above described is of simple construction and is serviceable and reliable. Owing to the arrangement of the parts, and in particular to the combination in a single assembly of the flywheel and yieldable driving means and to the arrangement of such assembly coaxially with the engine engaging part and its cooperating rotating elements, compactness of structure and reduction of overall dimensions results. Such a starter is broadly applicable to practically any internal combustion engine power plant of the kind normally used, for example, in aeroplanes.

While only one embodiment of the invention has been illustrated and described, it is to be expressly understood that the invention is capable of a variety of mechanical expressions, and that changes may be made in the form, details, and arrangement of the parts without departing from the spirit of the invention. Reference is therefore to be had to the appended claims for a definition of the limits of the invention.

What is claimed is:

1. In apparatus of the class described, a rotatable engine-engaging member, a flywheel, a train of reduction gearing connected to said member, a yieldable driving means carried by said flywheel and drivably connected to said train of gearing, means for rotating said member to store energy in the flywheel including said gear train, and means for axially shifting said member to engine-engaging position.

2. In apparatus of the class described, a rotatable engine-engaging member, a flywheel shaft disposed coaxially with said member, a flywheel on said shaft, a train of reduction gearing connecting said shaft and member, constantly engaged yieldable means mounted in said flywheel for drivably connecting said flywheel and shaft, means for manually rotating said member to store energy in the flywheel, and means for axially shifting said member to engine-engaging position.

3. In apparatus of the class described, a rotatable member having an axially shiftable engine-engaging part, a shaft mounted coaxially with said member, a combined flywheel and yieldable driving means mounted on said shaft, reduction gearing connecting said shaft with said member, means for rotating said member to store energy in the flywheel, and means for shifting said part to engine-engaging position.

4. In apparatus of the class described, a rotatable member having an axially shiftable engine-engaging part, a shaft mounted coaxially with said member, a combined flywheel and yieldable clutch means mounted on said shaft, a countershaft laterally spaced from said flywheel shaft, gears on said countershaft engaging said member and said flywheel shaft, means for rotating said member to store energy in said flywheel, and means for axially shifting said part to engine-engaging position.

5. In apparatus of the class described, a rotatable member having an axially shiftable engine-engaging part, a shaft mounted coaxially with said member, a flywheel on said shaft, friction means mounted on said flywheel and drivably connecting the flywheel and shaft, a countershaft laterally spaced from said shaft, gears on said countershaft engaging said member and said flywheel shaft, means for rotating said flywheel to store energy therein, and means for axially shifting said part to engine-engaging position.

6. A substantially cylindrical casing having an axial support therein, a member rotatably mounted on said support and having an axially shiftable engine-engaging part, a shaft having one end mounted in said support and the other end in said casing, a flywheel on said shaft, yieldable means drivably connecting said flywheel and shaft, reduction gearing connecting said shaft and member, means for rotating said flywheel, and means for axially shifting said part to engine-engaging position.

7. In apparatus of the class described, a substantially cylindrical casing having an axial support therein, a member rotatably mounted on said support and having an axially shiftable engine-engaging part, a shaft having one end mounted in said support and the other in said casing, a flywheel on said shaft, yieldable clutch means operatively connecting said flywheel and shaft, a countershaft, gears on said countershaft engaging said flywheel shaft and said member, means for rotating said member to store energy in the flywheel, and means for axially shifting said part to engine-engaging position.

8. In apparatus of the class described, a substantially cylindrical casing having a support therein, a member rotatably mounted on said support and having an axially shiftable engine-engaging part, a shaft having one end mounted in said support and the other in said casing, a combined flywheel and yieldable driving means mounted on said shaft, reduction gearing drivably connecting said shaft with said member, means for manually rotating said member to store energy in said flywheel, and means for axially shifting said part to engine-engaging position.

9. In apparatus of the class described, a substantially cylindrical casing having a support therein, a member rotatably mounted on said support and having an axially shiftable engine-engaging part, a shaft having one end mounted in said support and the other end in said casing, a combined flywheel and yieldable driving means mounted on said shaft, a countershaft, gears on said countershaft engaging said flywheel shaft and said member, means for rotating said flywheel to store energy therein, and means for axially shifting said part to engine-engaging position.

10. In engine starting apparatus, a member adapted to be shifted to engine-engaging position, a flywheel, a train of reduction gearing, said member being connected to the low speed end of said gearing, a constantly engaged friction clutch drivably connected to the flywheel, and means for drivably connecting the clutch to the high speed end of the gear train.

In testimony whereof I have signed this specification.

ROLAND CHILTON.